(12) United States Patent
Hogreve

(10) Patent No.: US 11,105,704 B2
(45) Date of Patent: Aug. 31, 2021

(54) METHOD AND APPARATUS FOR AN INTEGRITY TEST OF A FLEXIBLE CONTAINER WITH INSPECTION FLUID

(71) Applicant: Sartorius Stedim Biotech GmbH, Goettingen (DE)

(72) Inventor: Marc Hogreve, Adelebsen (DE)

(73) Assignee: Sartorius Stedim Biotech GmbH

( * ) Notice: Subject to any disclaimer, the term of this patent is extended or adjusted under 35 U.S.C. 154(b) by 391 days.

(21) Appl. No.: 15/572,243

(22) PCT Filed: May 9, 2016

(86) PCT No.: PCT/EP2016/000754
§ 371 (c)(1),
(2) Date: Mar. 12, 2018

(87) PCT Pub. No.: WO2016/177478
PCT Pub. Date: Nov. 10, 2016

(65) Prior Publication Data
US 2018/0188130 A1   Jul. 5, 2018

(30) Foreign Application Priority Data
May 7, 2015  (DE) ...................... 10 2015 005 833.9

(51) Int. Cl.
*G01M 3/22*   (2006.01)
*G01M 3/20*   (2006.01)
(52) U.S. Cl.
CPC ............ *G01M 3/227* (2013.01); *G01M 3/229* (2013.01); *G01M 3/202* (2013.01)

(58) Field of Classification Search
CPC ........ G01M 3/20; G01M 3/227; G01M 3/229; G01M 3/202; G01M 3/205
(Continued)

(56) References Cited

U.S. PATENT DOCUMENTS 3,762,212 A * 10/1973 Morley ................. G01M 3/202
73/40.7
4,557,139 A * 12/1985 Cantwell ............... G01M 3/223
73/40.7
(Continued)

FOREIGN PATENT DOCUMENTS

CN          2224414      4/1996
CN          102472682    5/2012
(Continued)

OTHER PUBLICATIONS

Fischer, Permeation and Measurement Techniques, 2007 PLACE Conference Sep. 16-20 St Louis, MO (Year: 2007).*
(Continued)

*Primary Examiner* — David L Singer
(74) *Attorney, Agent, or Firm* — Gerald E. Hespos; Michael J. Porco; Matthew T. Hespos

(57) ABSTRACT

A method, a device and a use of the device are provided for carrying out an integrity test on a test container (1) that has at least one flexible casing material. The method includes the steps of: filling a test fluid into the test container (1); and detecting the presence of test fluid directly outside the test container (1). The test fluid is designed in such a way that the permeation rate of test fluid through undamaged casing material of the test container (1) is not greater than $1 \cdot 10^{-6}$ mbar·m/(s·bar).

16 Claims, 6 Drawing Sheets

(58) Field of Classification Search
USPC .......................................................... 73/40.7
See application file for complete search history.

(56) References Cited

U.S. PATENT DOCUMENTS

| | | | | |
|---|---|---|---|---|
| 4,791,805 | A * | 12/1988 | Gates | G01M 3/226 73/40.7 |
| 5,163,315 | A * | 11/1992 | Asai | G01M 3/226 73/40.7 |
| 5,345,814 | A | 9/1994 | Cur et al. | |
| 5,422,240 | A | 6/1995 | Lytle et al. | |
| 5,499,529 | A | 3/1996 | Kronberg et al. | |
| 5,798,696 | A | 8/1998 | Wong | |
| 5,939,619 | A * | 8/1999 | Achter | G01M 3/229 73/40.7 |
| 6,351,984 | B1 | 3/2002 | Srinivasan | |
| 6,640,615 | B1 | 11/2003 | Morrow | |
| 7,905,132 | B1 * | 3/2011 | Chamberlain | G01M 3/229 73/40.7 |
| 8,910,509 | B2 | 12/2014 | Terentiev et al. | |
| 9,891,132 | B2 | 2/2018 | Wertli | |
| 2004/0177676 | A1 * | 9/2004 | Moore | G01N 15/0826 73/38 |
| 2005/0143939 | A1 * | 6/2005 | Harada | G01M 3/229 702/51 |
| 2007/0113621 | A1 * | 5/2007 | Kanematsu | G01M 3/202 73/40.7 |
| 2007/0119237 | A1 * | 5/2007 | Kanematsu | G01M 3/229 73/40.7 |
| 2007/0157704 | A1 * | 7/2007 | Jenneus | G01M 3/226 73/40.7 |
| 2008/0241521 | A1 * | 10/2008 | Solovyov | B32B 7/12 428/334 |
| 2009/0113995 | A1 * | 5/2009 | Golding | G01M 3/226 73/40.7 |
| 2009/0248324 | A1 | 10/2009 | Hamilton et al. | |
| 2011/0011164 | A1 * | 1/2011 | Terentiev | G01M 3/227 73/40.7 |
| 2011/0113861 | A1 * | 5/2011 | Maehira | G01M 3/205 73/40.7 |
| 2013/0038633 | A1 * | 2/2013 | Maggiore | B01D 65/104 345/633 |
| 2013/0199274 | A1 * | 8/2013 | Yamamoto | G01M 3/229 73/40.7 |
| 2014/0116115 | A1 * | 5/2014 | Dahlberg | G01M 3/3218 73/49.2 |
| 2014/0165707 | A1 * | 6/2014 | Dahlberg | G01M 3/32 73/49.2 |
| 2015/0153245 | A1 * | 6/2015 | Terentiev | G01M 3/04 73/40.7 |
| 2015/0211955 | A1 * | 7/2015 | Bounouar | G01M 3/229 73/49.3 |
| 2016/0116365 | A1 * | 4/2016 | Luedolph | G01M 3/202 73/40.7 |
| 2016/0178472 | A1 * | 6/2016 | Watanabe | G01M 3/202 73/40.7 |

FOREIGN PATENT DOCUMENTS

| | | | | |
|---|---|---|---|---|
| CN | 103542987 | | 1/2014 | |
| DE | 2728838 | A1 * | 1/1979 | ............ G01M 3/229 |
| DE | 10 2008 063 776 | | 7/2010 | |
| DE | 10 2013 000 086 | | 7/2014 | |
| EP | 0 640 822 | | 4/1998 | |
| EP | 3 292 387 | | 1/2021 | |
| FR | 2 747 779 | | 10/1997 | |
| JP | 2003185520 | A * | 7/2003 | |
| WO | 98/25120 | | 6/1998 | |
| WO | 2006/032591 | | 3/2006 | |
| WO | 2011/084096 | | 7/2011 | |
| WO | WO-2013000565 | A1 * | 1/2013 | .............. G01M 3/32 |

OTHER PUBLICATIONS

Stevens, White Paper 13-4102 Permeation and its Impact on Packaging, Mocon, (Year: 2014).*
Siracusa, Review Article Food Packaging Permeability Behaviour: A Report, Hindawi Publishing Corporation International Journal of Polymer Science vol. 2012, Article ID 302029, 11 pages doi: 10.1155/2012/302029 (Year: 2012).*
Rosato, New barrier plastic packaging materials advancing rapidly (Year: 2014).*
Hammon et al, Noble Gas Permeability of Polymer Films and Coatings, Journal of Applied Polymer Science vol. 21, 1989-1997 (Year: 1977).*
Versaperm, Longer Lasting & Tastier Food simple permeability test can show how to increase shelf life (Year: 2012).*
Machine Translation of CN103542987A (Year: 2020).*
Block, Hydrogen as Tracer Gas for Leak Testing, ECNDT 2006-Tu.2.6.1 (Year: 2006).*
European Pharmaceutical Manufacturer Magazine, Bag Tester Detects Single-Use Bioreactor Leaks Post Installation (Year: 2013).*
IEEE, IEEE Guide for Sulphur Hexafluoride (SF6) Gas Handling for High-Voltage (over 1000 Vac) Equipment (Year: 2012).*
Laco Technologies, Helium Leak Testing Flexible Wall Parts Leak Testing (Year: 2015).*
Santeler, Abstract of Leak detection—common problems and their solutions, Journal of Vacuum Science & Technology A 2, 1149 (1984) (Year: 1984).*
Hilleret, Leak detection, CAS—CERN Accelerator School : Vacuum Technology, pp. 203-211 (Year: 1999).*
Zapfe, Leak detection, CAS—CERN Accelerator School : Vacuum in Accelerators, pp. 227-240 (Year: 2007).*
Varian, VS Series Helium Mass Spectrometer Leak Detectors Operation Manual (Year: 2009).*
American Society for Testing and Materials, Standard Test Methods for Leaks Using the Mass Spectrometer Leak Detector in the Detector Probe Mode, Designation: E 499-95 (Year: 1995).*
Cappia et al, Enhanced Assurance of Supply for Single-Use Bags (Year: 2014).*
International Search Report dated Aug. 22, 2016.
Chinese Office Action dated Mar. 26, 2019.
European Office Action dated Sep. 16, 2019.
English translation of Office Action dated Sep. 16, 2019, Office Action for EP 16 724 845.9.
https://ens-newswire.com/2010/03/02/california-limits-sf6-worlds-most-potent-greenhouse-gas/.
https://advancedsciencenews.com/sf6-worries-the-most-potent-and-persistent-greenhouse-gas/.

* cited by examiner

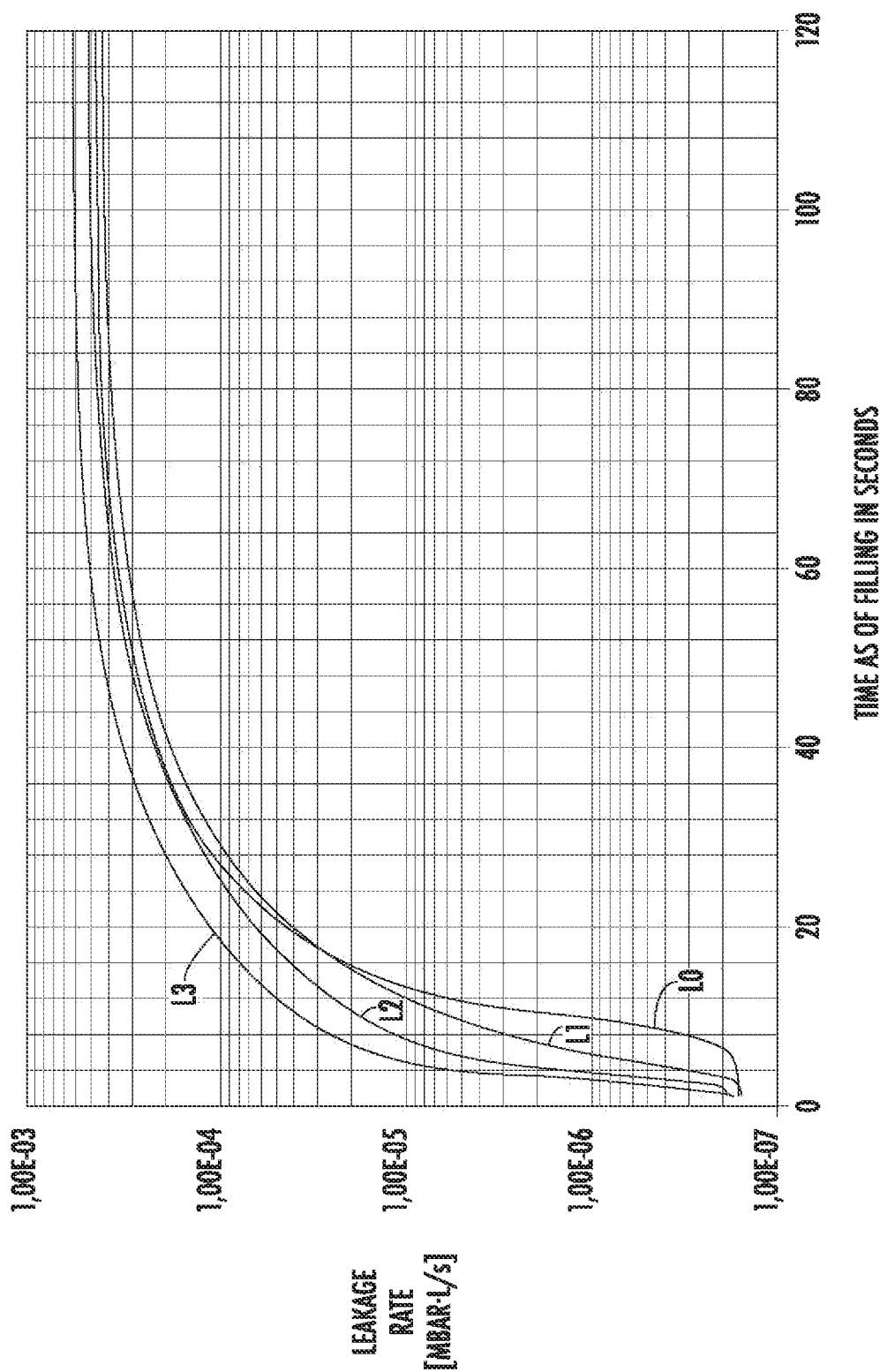

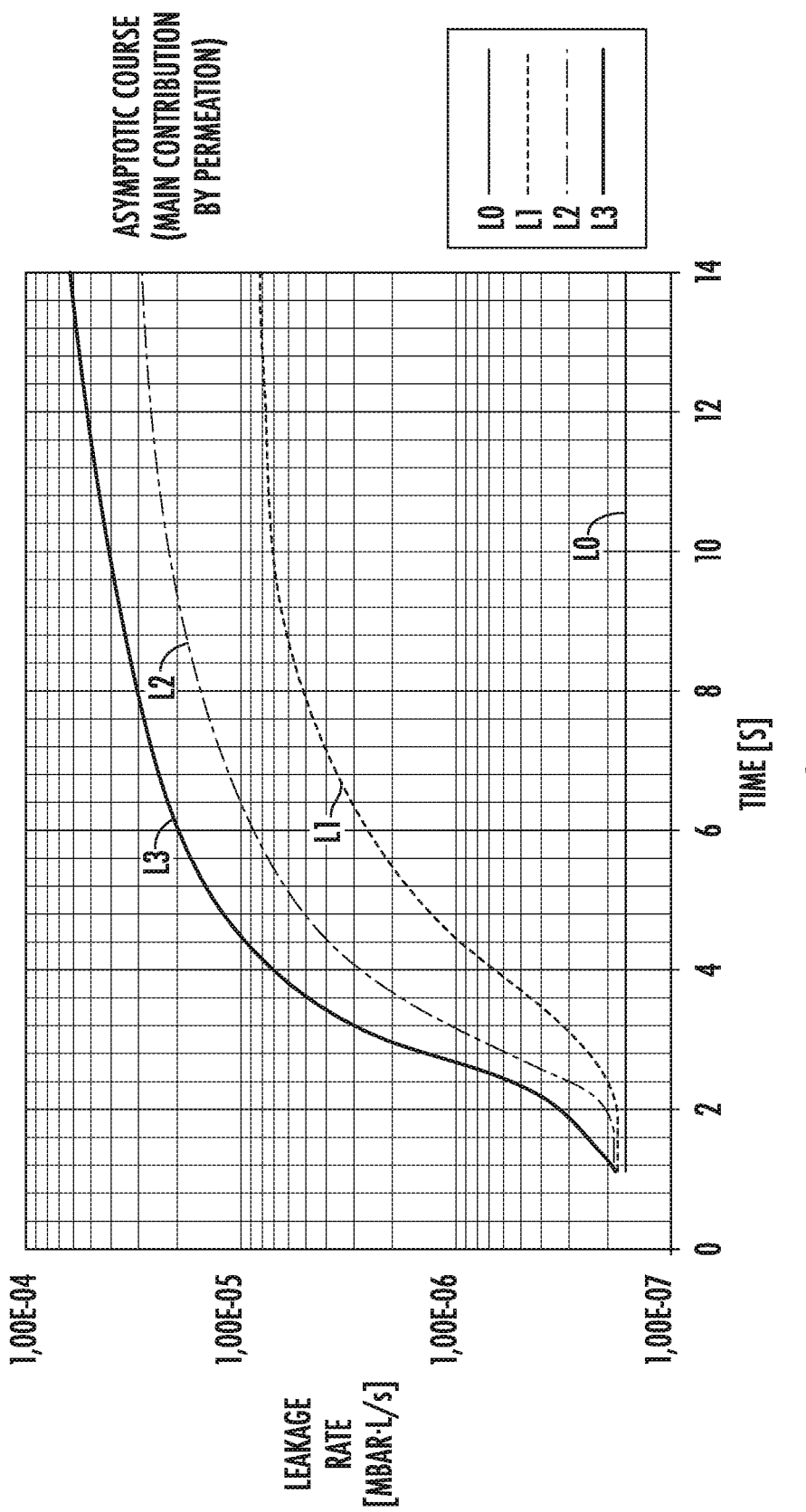

METHOD AND APPARATUS FOR AN INTEGRITY TEST OF A FLEXIBLE CONTAINER WITH INSPECTION FLUID

BACKGROUND

Field of the Invention

The invention relates to a method and a device for carrying out an integrity test on a flexible test container.

Description of the Related Art

Hermetically sealed, flexible containers such as plastic bags are widely used especially in bioprocessing. In many applications, flexible containers are used for accommodating cell culture solutions, blood bags, solutions for bioreactors, etc. Sterilized containers that are to maintain their sterility during use are often used especially in bioprocessing.

Due to the increasing criticality of applications in which flexible containers or bags, particularly so-called "single-use bags" are used, the requirement concerning the sensitivity of the leak test of such containers or bags increases as well. Accordingly, the corresponding standards for performing leak tests are often changed and revised. Typically, the standard is often inspired by the most sensitive known test method.

In order to recognize a damaged container thus unsuitable for sterile use, the flexible container is often subjected to a leak test and/or an integrity test before use. Here, a flexible container to be inspected (hereinafter also referred to as a test container) is filled with an inspection fluid, in particular an inspection gas, and arranged in a sealable inspection container. In the inspection container, a lower pressure, preferably a vacuum, than in the test container is often created. If the test container has a leak, the inspection fluid will exit the test container through the leak due to the pressure difference between the test container and the inspection container and can be detected in the inspection container.

If no inspection fluid is detected in the inspection container, the test container will pass the leak test and/or integrity test. If inspection fluid is detected in the inspection container due to a leak, the test container is unsuitable for use as a sterile container. Increasing demands on the leak tightness are especially accompanied by the requirement to be able to detect small leaks. Under certain circumstances, it is therefore necessary or helpful to be able to detect even slightest inspection fluid quantities and to reliably distinguish the detection of inspection fluid caused by leaks from a measuring background or noise.

Especially in the case of particularly high demands on the sensitivity and reliability of leak tests, the use of helium as an inspection gas has proven particularly. On the one hand, helium penetrates even through very small leaks in a reliable way. On the other hand, helium can be detected very reliably with simple means and can be distinguished from other background gases.

In view of the increasing requirements on integrity tests in many technological areas, especially bioprocessing, it is the object of the invention to further improve the reliability of the detection of even smaller leaks also in larger, more flexible test containers.

SUMMARY

In a first aspect, the invention relates to a method for carrying out an integrity test on a test container comprising at least one flexible shell material. The method comprises the steps of:

filling an inspection fluid into the test container; and
detecting inspection fluid directly present outside the test container;
wherein the inspection fluid is configured such that the permeation rate of inspection fluid through intact shell material of the test container is not greater than $1 \cdot 10^{-6}$ mbar·m/(s·bar).

With the method according to the invention, the integrity of the test container can be checked, in particular a leak of the test container, for example in the shell material, can be detected. A test container with flexible walls, such as a plastic bag, is examined as a test container. The test container can have an opening at at least one point, through which the inspection fluid can be introduced into the test container. To this end, the test container can have a coupling for coupling to a supply line at its opening.

The method according to the invention has the technical advantage that a leak in the test container can be detected with a particularly high accuracy and/or in a particularly reliable way. This advantage of the invention is particularly pronounced in large test containers, such as flexible plastic bags with a capacity of several liters, preferably of several tens of liters, particularly preferably of more than one hundred liters.

A further advantage of the method according to the invention is that for carrying out the integrity test and/or for detecting a leak in the test container, a longer period may be available than in conventional methods. This advantage of the invention makes it possible to inspect bags having a large capacity particularly efficiently and reliably, because preferably more time for inflating the bag and/or unfolding the bag and/or achieving a steady state of the bag filled with inspection fluid is available than in a conventional method. The method according to the invention thus has the advantage that it provides a reliable method for carrying out an integrity test also for very large bags.

Contrary to the expectations of a person skilled, it has been found in the invention that the inventive method further offers the advantage that also very small leaks can be detected in the test container.

Traditionally, He is often used as an inspection fluid for detecting very small leaks. He is widely used to carry out leak tests particularly because highly sensitive sensor systems are available for the detection of He, which allow the detection of already very low concentrations or quantities of He. This is further supported by the fact that the He concentration naturally present in the atmosphere is very low, which is why a detection of He with a very low background value is possible. In addition, helium diffuses very quickly, which is why often a very short response time of a detection system is expected. Moreover, He is advantageous in that it is inert as a rare gas, and thus there is no danger of a chemical or physical interaction with the test container, and no complex arrangements for the use of He must be taken because He does not pose a risk to the test container, humans or the environment. For the above reasons and advantages, He is a very common gas for carrying out leak tests.

Despite the numerous advantages of the use of He in conventional leak tests, it has been found in the invention that especially small leaks can be detected efficiently if the permeation of inspection fluid through intact shell material does not exceed a value of $1 \cdot 10^{-6}$ mbar·m/(s·bar) (in particular during the detection of existing inspection fluid). This may particularly be the case if the inspection fluid comprises e.g. large atoms and/or molecules that are significantly larger than He atoms and are thus conventionally regarded less suitable for the detection of small leaks.

Contrary to the expectations of a skilled person, this advantage arises from the fact that disturbing influences on the measurement signal due to permeation can be reduced or even avoided completely by the method according to the invention.

Further, the method according to the invention offers the advantage that it is possible to distinguish more accurately between different leak sizes or leak diameters and that a characterization of the test container can be performed more reliably. In addition, by reducing possible disturbing influences due to permeation, the method according to the invention allows for a faster and more efficient measurement or inspection, as for example a large number of measurements on one and the same test container and averaging can be dispensed with while still sufficient sensitivity can be achieved.

As an inspection fluid, for example gases and/or liquids may be used. Gases have the advantage that filling of the test container and also the detection can often be faster than with liquids. Preferably inert and/or non-toxic gases are used in order to avoid damage to the test container and/or to the environment. The inspection fluid can in particular be designed as an inspection gas, which does not occur in normal air mixture, or only in a very small amount. This avoids that by the detection of residual air in the inspection container a leak of the test container is incorrectly assumed.

The detection of the inspection fluid directly outside the test container may be carried out in an inspection container, with the test container being at least partially mounted in the inspection container. The detection of the inspection fluid is preferably carried out outside the test container, but within the inspection container. If the test container has a leak, inspection fluid can preferably enter the inspection container from the filled test container and be detected there. If no inspection fluid enters the inspection container from the test container, preferably substantially no inspection fluid is present in the inspection container. "Substantially no inspection fluid" means that a background concentration of inspection fluid must be present in the inspection container, which upon the detection of the inspection fluid appears as a background leakage rate, which however does not curtail the validity of the detection of the inspection fluid or the measurement significantly.

Preferably, a pressure difference of inspection fluid between the interior and the exterior of the test container is a driving force, which in the event of a leak in the test container drives inspection fluid out of the test container, where it can preferably be detected.

Here, the permeation rate denotes the rate of permeation of the inspection fluid through intact shell material, i.e. the rate at which inspection fluid can permeate or diffuse through intact shell material. A permeation rate of $1 \cdot 10^{-9}$ m/s, for instance, corresponds to an inspection fluid quantity due to permeation of $1 \cdot 10^{-6}$ mbar·m$^3$ per second, per 1 m$^2$ area of contact between shell material and inspection fluid and at a pressure difference of 1 bar.

The permeation of inspection fluid through intact shell material denotes the penetration of the shell material of the test container by inspection fluid at points of the test container not having a leak. For example, the permeation arises from the fact that inspection fluid particles, such as atoms or molecules, diffuse through the shell material. Within the scope of the invention, it has been found that the permeation, which depends on the combination of shell material and inspection fluid, in practice limits the measurement time within which a clear distinction between a detection of inspection fluid outside the test container due to a leak on one hand and due to diffusion through intact shell material on the other hand such that in particular for larger test containers a detection of leaks with a size below a resolution limit is no longer reliably possible with only one measurement cycle. With the method according to the invention, however, it is possible to extend the measurement time significantly without the contribution of the permeation to the detection of the inspection fluid covering the contribution of a small leak. Thus, even smaller leaks can be detected much more reliably.

For example, different inspection fluids may have different permeation properties, such as permeation velocity and/or rate, for one and the same shell material. In the same way, one and the same inspection fluid may have different permeation properties for different shell materials. For example, the thickness and/or the material and/or the nature and/or the surface structure of the shell material may have an influence on the permeation of one and/or different inspection fluids.

Within the scope of the present invention, it has been found that a method for carrying out an integrity test is particularly efficient if the permeation of the applied inspection fluid through the shell material of the test container to be inspected does not exceed a value of about $1 \cdot 10^{-6}$ mbar·m/(s·bar), preferably a value of about $5 \cdot 10^{-7}$ mbar·m/(s·bar), more preferably a value of about $1 \cdot 10^{-7}$ mbar·m/(s·bar), more preferably a value of about $5 \cdot 10^{-8}$ mbar·m/(s·bar), even more preferably a value of about $1 \cdot 10^{-8}$ mbar·m/(s·bar), most preferably a value of about $5 \cdot 10^{-9}$ mbar·m/(s·bar).

If a sheet material has a permeation rate of $1 \cdot 10^{-6}$ mbar·m/(s·bar) for a given inspection fluid, for example at a 1 bar pressure difference of test fluid between the two sides of the shell material, through an area of 1 m$^2$ of the shell material, an inspection fluid stream that equals a leakage rate of $5 \cdot 10^{-8}$ mbar·m$^3$/s or $5 \cdot 10^{-5}$ mbar·l/s is caused.

In other words, a permeation rate of $1 \cdot 10^{-6}$ mbar·m/(s·bar) can be considered an effective permeation flow velocity of the corresponding inspection fluid through the shell material, which then has an equivalent value of $1 \cdot 10^{-9}$ m/s. The thus determined permeation rate or permeation flow velocity is a parameter that characterizes a particular combination of shell material and inspection fluid.

One way to determine the permeation rate or the permeation flow velocity for a particular inspection fluid through a shell material, which can be used in particular for setting the permeation upper limit according to the invention, is to introduce a bag of the shell material into an inspection container, to evacuate the inspection container, i.e. to generate a pressure of 10 mbar or a pressure of not more than 10 mbar, preferably between 10$^2$ mbar and 10 mbar within the inspection container directly outside the bag or test container, and to then fill the bag with the particular inspection fluid with a pressure of e.g. 50 mbar. By measuring the concentration of inspection fluid present in the inspection container directly outside the test container, the permeation rate or permeation flow velocity of the inspection fluid through the shell material can be determined with knowledge of the surface area of the shell material of the bag. Here, this permeation measurement should particularly be carried out at room temperature (20° C.).

Preferably, there is a pressure difference of inspection fluid, at which a test pressure of inspection fluid in the test container is greater than an ambient pressure directly outside the test container. Here, the pressure difference is preferably a driving force which in the event of a leak in the test container drives inspection fluid out of the test container, so that it can be detected outside the test container. To this end, the total pressure or absolute pressure within the test container may be greater than the total pressure outside the test container. For example, substantially only inspection fluid may be present in the test container, while outside the test container there is substantially a vacuum.

Preferably, the inspection fluid comprises one or more of the substances Ne, Ar, Kr, Xe, Rn, $CO_2$, $H_2O$, and $SF_6$. Here, different inspection fluids may be advantageous for different shell materials of different test containers. Further, different inspection fluids may be advantageous for different thicknesses of the shell material. An inspection fluid is especially advantageous or suitable for a shell material if the permeation rate of the inspection fluid through the shell material does not exceed a value of $1 \cdot 10^{-6}$ mbar·m/(s·bar). If an inspection fluid only has such a low permeation through a shell material, it has the advantage of a longer retention period, which means that more time is available to carry out the complete inspection procedure before the inspection fluid diffusing through intact shell material makes a distinction between a defective and an intact specimen (test container) difficult or impossible. Thereby, filling of the test container with inspection fluid can in particular take more time, without the reliability of the measurement being endangered by a high amount of permeated inspection fluid already during filling. This allows a gentler filling of the test container with inspection fluid than would be possible in conventional methods, such as when He is used as the inspection fluid.

For example, with the use of $SF_6$, a measurement time for the evaluation or determination of the tightness of the test container may be selected to be significantly longer than with the use of He, so that a longer accumulation or a larger amount of inspection fluid exiting through a leak in the test container test can be taken as a basis for the measurement. Thus, this can increase the sensitivity of the test system, so that leaks with smaller diameters can also be reliably detected even in test containers having a large surface.

Based on the prior art, a skilled person would assume that for reliably detecting small leaks, for example with a diameter in the order of 1 μm, inspection fluids such as He, which diffuse very fast and can be detected easily, are preferable. Within the scope of the invention, however, it has been found that in contrast to the expectation of a skilled person and established practice in the prior art, the use of gases with a rather inert diffusion behavior, such as $SF_6$, enables a more reliable detection of such small leaks when the method according to the invention is applied.

For example, for test containers having a shell material comprising PE (polyethylene) and/or EVOH (ethylene vinyl alcohol) and/or EVA (ethylene vinyl acetate) or consisting thereof and having a thickness for example in a range from about 100 μm to about 1000 μm, $SF_6$ may be an advantageous choice for the inspection fluid. Here, an inspection fluid may be pure, i.e. consist of only one kind of atoms or molecules, or be a mixture, i.e. comprise different atoms and/or molecules.

Preferably the pressure difference is in a range of from about 10 mbar to about 1 bar. More preferably, the pressure difference is in a range of from about 20 mbar to about 0.5 bar, more preferably in a range from about 30 mbar to about 0.4 bar, most preferably in a range from about 50 mbar to about 0.3 bar. Particularly preferably, the pressure difference is such that the test container inflates and unfolds, and that in case of a leak in the test container an inspection fluid stream exits the test container in an efficient manner. However, preferably, the pressure difference is not so large that due to the pressure difference mechanical damage of the shell material of the test bag are to be expected and/or may occur.

Preferably, the detection of the inspection fluid outside the test container takes place at least partially in a period that continues after filling of the inspection fluid for more than 8 seconds, further preferably more than 12 seconds, even more preferably more than 20 seconds, most preferably more than 30 seconds. Here, "after filling" means that the process of filling the inspection fluid is preferably completely finished, i.e. that the valves opened for filling the inspection fluid into the test container are fully closed again. Alternatively or in addition, "after filling" may also mean that the pressure within the test container has reached the maximum pressure achieved during the test procedure (after evacuation of the inspection container) for the first time by at least 80%, preferably at least 90%, even more preferably at least 95%.

Preferably, the at least one shell material has a thickness of not more than about 2 mm, preferably not more than about 1 mm, more preferably not more than about 500 μm, still more preferably not more than about 400 μm, most preferably not more than about 300 μm.

Preferably, the at least one shell material comprises a plastic, in particular one or more plastics from the list comprising EVA, EVOH, and PE. Particularly preferably, the shell material of the test container is designed such that the test container is flexible. For example, the test container is a plastic pouch, a plastic bag or a plastic sack.

The shell material may for example comprise one or more layers of EVA and/or one or more layers of EVOH. Preferably, the shell material has a layer of EVOH, which is surrounded on both sides by at least one layer of EVA.

The capacity of the flexible test container is preferably at least about 10 ml, preferably at least about 0.1 l, more preferably at least about 1 l, further preferably at least about 5 l, even more preferably at least about 10 l, more preferably at least about 25 l, most preferably at least about 50 l.

Test containers with different sizes and/or thicknesses of the shell material may require different filling pressures and/or different pressure differences to unfold or inflate in a manner suitable for measuring. Furthermore, different inspection fluids may be advantageous for test containers with different capacities, as often test containers with different capacities differ in size of the surface of the shell material and thus the permeation is more or less critical to the integrity test.

Preferably, the detection of the inspection fluid present directly outside the test container is performed by means of LASER absorption. Preferably, the absorption or extinction or transmission of LASER radiation is measured at one or more specific wavelengths outside of the test container and, based on the absorption or extinction or transmission, the presence of inspection fluid outside the test container is determined. Specifically, the measurement is carried out by means of light and/or LASER radiation of one or more wavelengths, which are particularly efficiently absorbed and/or scattered by atoms and/or molecules of the inspection fluid. To this end, light propagates preferably over a predetermined distance outside the test container before the intensity thereof is determined by means of a detector afterward. Such a detector may be designed as a photodiode, which is sensitive to the light used. The light used must not necessarily be LASER radiation, but may originate from other light sources as well, such as LEDs or thermal emitters. In some cases, prior spectral filtering of the light spectrum may be advantageous.

Different inspection fluids may have different demands on the spectral characteristics of the light used. A use of LASER absorption for the detection of $SF_6$ as part of a diffusion test for porous filters is described in document EP 0 640 822 B1, for example.

Alternatively or in addition, other methods known in the prior art may be used for the detection of fluids, for example gases. Examples of such methods are gas chromatography, mass spectrometry and/or chemical detection methods.

In another aspect, the invention relates to a test device for carrying out an integrity test on a test container comprising at least one flexible shell material, comprising
- an inspection fluid source, from which an inspection fluid can be filled into the test container; and
- an inspection fluid detector for detecting inspection fluid directly outside the test container;

wherein the inspection fluid is configured such that the permeation rate of inspection fluid through intact shell material of the test container is not greater than $1 \cdot 10^{-6}$ mbar·m/(s·bar).

The inspection fluid source may comprise a reservoir of inspection fluid. For example, the inspection fluid source may comprise a tank or a gas cylinder, which contains the inspection fluid and may dispense to the test device. In addition, the inspection fluid source may be part of an inspection fluid supply unit, which for example further comprises means for recycling or collecting and/or reusing used inspection fluid.

The inspection fluid detector preferably comprises a device for the measurement of LASER absorption. Alternatively or in addition, the inspection fluid detector may be adapted to use other methods for detecting fluids, e.g. gases. Examples of such methods are, as already described above, gas chromatography, mass spectrometry and/or chemical detection methods.

In another aspect, the invention relates to the use of a test device according to the invention for carrying out an integrity test on a flexible test container according to the method according to the invention.

In a further aspect, the invention further relates to the use of $SF_6$ for carrying out an integrity test on a flexible test container comprising at least one shell material, wherein the at least one shell material comprises one or more plastics from the list comprising EVA, EVOH and PE.

The invention will be explained in more detail below based on embodiments shown in figures. Individual aspects of the embodiments illustrated in the figures may be combined with other embodiments.

BRIEF DESCRIPTION OF THE DRAWINGS

FIG. 3B is a diagram with the time courses illustrated in FIG. 3A on a longer time scale.

FIG. 4 is a diagram with time courses of measured changes in the inspection fluid quantity outside the test container for one tight and several defective test containers when $SF_6$ is used as the inspection fluid.

DETAILED DESCRIPTION

Figure 1:
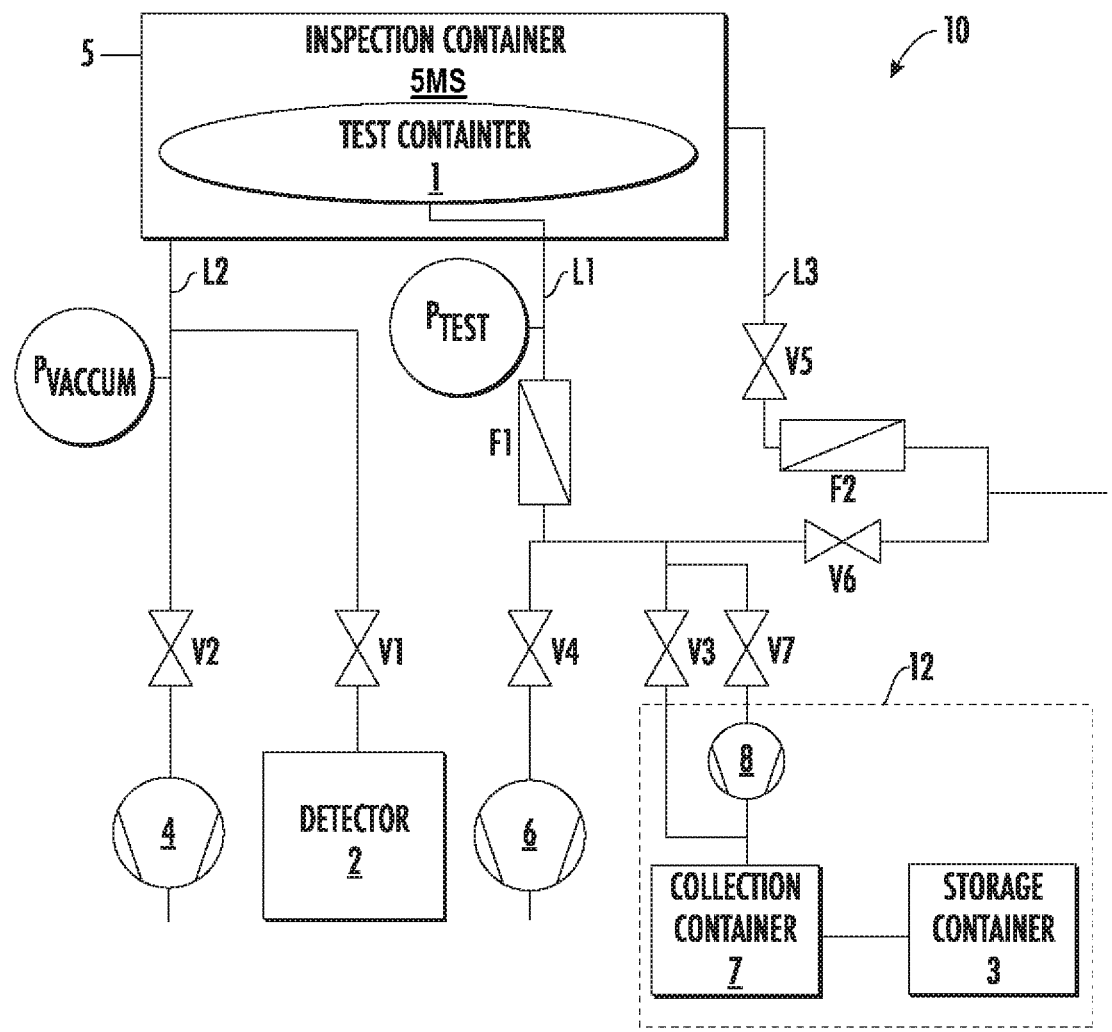
FIG. 1 is a schematic representation of an inventive test device in a preferred embodiment for carrying out an integrity test on a flexible test container.

FIG. 1 shows a schematic representation of an inventive test device 10 according to a preferred embodiment for carrying out an integrity test on a flexible test container 1.

The test device 10 comprises an inspection container 5, which is preferably designed to be openable and closable in a fluid-tight way. The inspection container 5 may be dimensionally stable and have metal and/or plastic walls, for example. The inspection container 5 is preferably designed and provided to withstand negative pressure, in particular a vacuum, in its interior. "Negative pressure" means that the pressure in the interior of the inspection container is smaller than outside the inspection container. For example, the inspection container 5 may be designed to withstand a pressure in the interior e.g. between about $10^{-7}$ mbar and about 100 mbar and an atmospheric pressure of about 1 bar outside the test container, i.e. to remain dimensionally stable and/or fluid-tight substantially at such a pressure difference. An opening of the inspection container 5 (not shown in FIG. 1) may comprise gaskets to ensure a fluid tight seal. The opening may serve to introduce one or more test containers into the inspection container and/or remove it/them and to close the inspection container in a fluid-tight way after the introduction and/or removal of the test container. "Substantially fluid-tight" means that the test container is able keep the pressure difference between the interior and exterior of the inspection container over a sufficiently long time within desired tolerances in order to be able to carry out an integrity test on the bag mounted in the inspection container or the bags mounted in the inspection containers in a reliable way.

The flexible test container 1 is preferably arranged in a removable way in the inspection container 5. The inspection container 5 may have a mechanical support 5MS, in particular a bearing surface matched to the test container 1, on which the test container 1 can be placed in a substantially wrinkle-free manner. The mechanical support 5MS may be formed of a porous material, whereby blocking of a leakage of the test container can be prevented by the support.

The flexible test container 1 to be tested may be formed as a single container or as an assembly of several containers, which are interconnected by hoses, for example. The test container 1 is formed to be at least partially flexible.

The test container 1 has an opening that is coupled to a test container supply line L1. Via the test container supply line L1, fluids may be supplied to the interior of the test container 1 mounted in the inspection container 5, and/or fluids may be discharged from or pumped out of the interior of the test container 1. In particular, the test container 1 can be evacuated via the test container supply line L1 and/or be filled with test fluid and/or be ventilated.

For example, during the provision of the negative pressures in the test container 1 and in the inspection container 5, the level of the negative pressure in the test container may be adapted to the level of the negative pressure in the inspection container. Negative pressure in this context means a lower pressure than the pressure outside the inspection container 5, such as atmospheric pressure. Here, for example, both negative pressures can be actively monitored and/or controlled, both negative pressures can be generated via a common vacuum pump and/or a connection valve between the two interior spaces can be opened during the pumping-out process. In particular, in this case maintaining a pressure difference upper limit between the pressure in the interior of the inspection container and the pressure in the interior of the test container may be intended and provided.

According to a further development of this embodiment, a pressure compensation between the interior of the test container and the interior of the inspection container is carried out during the provision of the negative pressures in the test container and in the inspection container. This can be done e.g. by opening a separating valve between these two interior spaces. Due to the pressure compensation, a harmfully high pressure difference between these two interior spaces is avoided.

The pressure compensation between the interior of the test container 1 and the interior of the inspection container 5 may be effected by matching between an inspection container pump 4 for pumping or evacuating the interior of the sealed inspection container 5 and a test container pump 6 for pumping or evacuating the interior of the test container 6. Thus, for example one of said at least said two pumps 4 and 6 can be controlled such during operation that the negative pressures in the two interior spaces can be matched to each other. The control of the at least one pump may include throttling, temporarily disabling and/or enhancing the pumping performance.

Alternatively or in addition, the pressure compensation may be effected by means of a separating valve (not shown). The separating valve is arranged so that it separates the interior of the inspection container 5 from the interior of the test container 1. The separating valve may be arranged in a corresponding connecting line. The separating valve is controllable and can be opened and closed.

According to one embodiment, a substantially equally high negative pressure is provided in the test container 1 and in the inspection container 5.

According to the illustrated embodiment, the interior of the inspection container 5 is further preferably connected to two supply lines, namely to an inspection container supply line L2 and to an inspection container vent line L3. Via the inspection container supply line L2 and an inspection container evacuation valve V2, the interior of the inspection container 5 can be connected to an inspection container pump 4. Furthermore, the interior of the inspection container 5 can be connected to an inspection fluid detector 2 via the inspection container supply line L2 and a detector valve V1. The inspection fluid detector 2 suitable for the inspection fluid used serves to detect the inspection fluid exiting the test container 1 in the event of a leak in the test container 1, wherein in the event of a leak at least part of the inspection fluid is present preferably in the interior of the inspection container 5 but outside the test container 1, and can be detected there by the inspection fluid detector 2 from a minimum concentration.

The inspection fluid detector 2 is designed and provided to detect the concentration of a predetermined inspection fluid in the interior of the inspection container 5. For example, the inspection fluid detector 2 may comprise a gas detector on the basis of a LASER absorption and/or a gas chromatograph and/or a mass spectrometer and/or an optical spectrometer.

The inspection container pump 4 may be designed as a high vacuum pump that can evacuate the interior of the inspection container 5 preferably to a high vacuum with a pressure of not greater than $10^{-3}$ mbar, e.g. to provide a very low background leakage rate in the inspection container 5. Here, the background leakage rate is the detected leakage rate, which is detected if no inspection fluid is introduced into the test container 1 and/or the inspection container 5.

The background leakage rate can be influenced for example by inspection fluid still present in the inspection container 5 from previous measurements or by a defective tightness of the inspection container.

A low background leakage rate enables a fast measurement. The smaller the background leakage rate in the inspection container 5, the more pronounced is a dynamic behavior, such as the increase of the measurement signal, the specific leakage rate. A low background leakage rate thus increases the speed at which a leak or leaking point in the test container 1 can be detected in case of a defect of the test container. 1 Such a dynamic increase in the concentration of inspection fluid in the interior of the inspection container 5, in particular before a significant permeation through side walls of the test container 1 occurs, can be evaluated for the detection of a leak in the test container 1. In particular, the demands on the background leakage rate, namely that the background leakage rate be very low, are particularly important if only a very limited measurement period available due to rapid permeation of the inspection fluid through the test container. In other words, the shorter the duration available for the measurement, the greater the demands on the background leakage rate.

Arranged in the test container supply line L1 is further a test container filter F1, which is designed as a particle filter and preferably inhibits a passage of particles, in particular dirt particles, through the test container supply line L1.

Via the test container supply line L1 and a test container pump valve V4, the interior of the test container 1 is connectable to a test container pump 6, which can generate a negative pressure, in particularly vacuum, in the test container 1.

The test container pump 6 is designed to and provided, simultaneously with the evacuation of the inspection container 5 performed by the inspection container pump 4, to cause the evacuation or pumping of the test container 1, whereby a pressure difference between the interior and the exterior of the test container 1 is reduced or is avoided even completely and thus the risk of damage to the test container 1 due to a strong inflation and/or compression during evacuation can be reduced or eliminated even completely. At the end of the test, the test container pump 6 may be used to evacuate the inspection fluid out of the test container 1, for example.

Furthermore, the interior of the test container 1 is connected to an inspection fluid supply unit 12 via the test container supply line L1. The inspection fluid supply unit 12 is connected to the test container supply line L1 in parallel via an inspection fluid supply valve V3 and via an inspection fluid discharge valve V7. Here, parallel means that the inspection fluid supply valve V3 and the inspection fluid discharge valve V7 are independently of one another, in particular directly, connected to the test container supply line L1. The inspection fluid supply unit 12 comprises an inspection fluid collection container 7 and an inspection fluid storage container 3. The inspection fluid storage container 3 is connected to the test container supply line L1 via the inspection fluid collection container 7 and is preferably designed to introduce a desired inspection fluid quantity into the inspection fluid collection container 7, if necessary. Between the inspection fluid storage container 3 and the inspection fluid collection container 7 there may be arranged a valve (not shown), so as to control the flow of inspection fluid from the inspection fluid storage container 3 into the inspection fluid collection container 7. Preferably, SF6 is used as the inspection fluid in the embodiment shown.

The inspection fluid collection container 7 is preferably directly connected to the test container supply line L1 and thus to the test container 1 via the inspection fluid supply valve V3. Further, the inspection fluid collection container 7 is connected to the test container supply line L1 and thus to the test container 1 successively via the inspection fluid discharge valve V7 and via an inspection fluid recycling pump 8.

The inspection fluid supply unit 2 is designed such that by opening the inspection fluid supply valve V3, inspection fluid can flow from the inspection fluid collection container 7 via the test container supply line L1 into the test container 1. This can preferably take place such that inspection fluid with a test pressure $p_{test}$ is present in the test container 1, and preferably in the test container supply line L1. The test pressure $p_{test}$ is preferably in a range from about 1 mbar to about 10 bar, further preferably in a range of from about 10 mbar to about 1 bar, even more preferably in a range from about 20 mbar to about 0.5 bar, most preferably in a range of from about 50 mbar to about 0.35 bar.

The inspection fluid in the inspection fluid collection container 7 and/or in the inspection fluid storage container 3 may be biased at a predetermined and/or predeterminable test pressure to establish the test pressure in the test container 1 almost immediately by relaxation of the inspection fluid, when the inspection fluid supply valve V3 is opened.

The inspection fluid supply unit 12 is furthermore designed such that by opening the inspection fluid discharge valve V7, inspection fluid can exit or be pumped out of the test container 1 by the inspection fluid recycling pump 8 via the test container supply line L1, and the pumped inspection fluid can flow into the inspection fluid collection container 7. In particular, the inspection fluid recycling pump 8 can evacuate the test container 1 from the inspection fluid and supply the inspection fluid pumped thereby to the inspection fluid collection container 7 for reuse as part of a further integrity test.

Preferably, the inspection fluid discharge valve V7 and the inspection fluid supply valve V3 are not opened simultaneously. In other words, preferably the inspection fluid supply valve V3 or the inspection fluid discharge valve V7 or both are closed at any one time.

In the illustrated embodiment, the test device 10 further comprises an inspection container vent line L3. By opening the inspection container vent valve V5, the inspection container can be vented in particular to atmospheric pressure when required. During ventilation of the inspection container 5, the supply air flows through the inspection container filter F2 to prevent e.g. dirt or debris from entering the inspection container. Furthermore, the test device 10 shown comprises a test container vent valve V6. By opening the test container vent valve V6, the test container 1, in particular the interior of the test container 1, and the associated lines or inspection fluid lines can be ventilated.

Preferably, the test container pump 6 is arranged outside the inspection container 5, whereby compact dimensioning of the inspection container is made possible.

The test device 10 may further comprise a controller for controlling the valves and/or pumps of the test device 10. The controller may include a computer processor.

The test device 10 particularly allows the simultaneous provision of a negative pressure in the inspection container and in the test container.

In one embodiment, the test device 10 comprises a separating valve between the interior of the test container 1 and the interior of the inspection container 5 (not shown). A pressure compensation can be achieved by means of the separating valve, which reduces a strain on the test container 1 at differently high negative pressures.

The test device 10 shown in FIG. 1 is used to carry out an integrity test on the flexible test container 1. Here, the test container 1 is interchangeable and not part of the test device 10. Instead, the test device 10 can be used repeatedly for inspecting a plurality of different flexible test containers.

Figure 2:
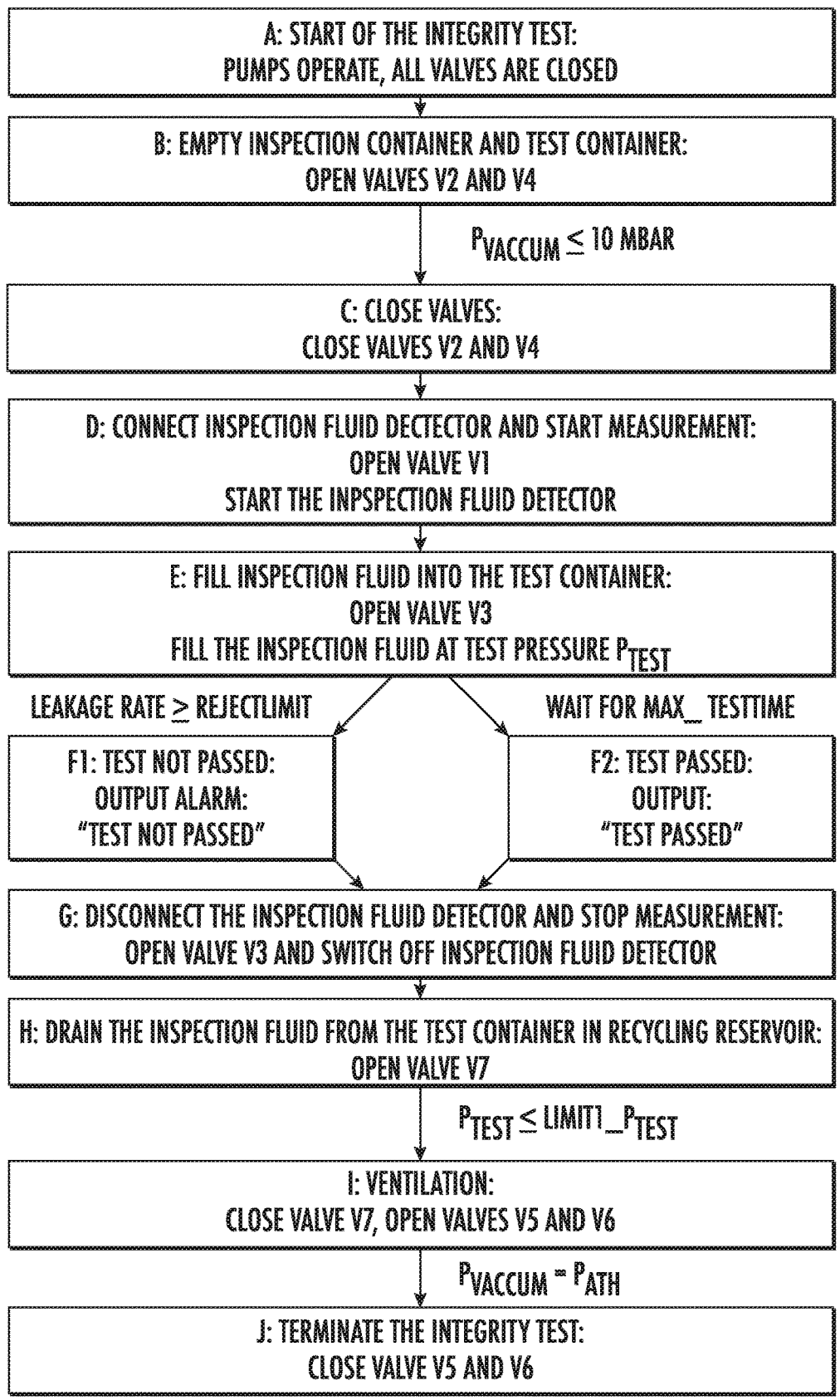
FIG. 2 is a flowchart of a method according to the invention in a preferred embodiment for carrying out an integrity test on a flexible test container.

The sequence of the corresponding test method is shown in a schematic flowchart in FIG. 2. This flowchart indicates individual method steps of a method for carrying out an integrity test on a flexible test container, which are shown in the flowchart of FIG. 2 for controlling the test device 10 shown in FIG. 1.

The integrity test starts with method step A. At the beginning, all pumps of the test device, in particular the inspection container pump 4 and the test container pump 6, all pumps operate. Preferably, the inspection fluid recycling pump 8 operates as well. Furthermore, at the beginning of the process, all valves of the test device 10 are closed.

In method step B, both the inspection container 5 and the test container 1 are emptied, more specifically, negative pressure compared to atmospheric pressure is provided in these two containers, for example a high vacuum. This is done by opening the inspection container evacuation valve V2 and the test container pump valve V4, whereby the two pumps 4 and 6 are connected. The evacuation of the test container 1 is preferably carried out simultaneously or parallel to the evacuation of the inspection container 5. For example, to carry out the integrity test, in the inspection container 5 and/or in the inspection fluid detector 2 or in the lines connecting the inspection container 5 with the inspection fluid detector there may be a prevailing pressure in a range of about $10^{-5}$ mbar to about 100 mbar, preferably in a range of about $10^{-3}$ to about 50 mbar, more preferably in a range from about 0.1 mbar to about 20 mbar.

In particular, the pressure may be chosen such that the pressure is suitable for the inspection fluid detector 2 used. For this reason, different values of the pressure may be necessary or useful for different types of inspection fluid detectors 2. For example, for an inspection fluid detector 2 based on an optical detection method, such as LASER absorption in particular for the detection of $SF_6$, a pressure of about 10 mbar may be advantageous and/or necessary. In contrast, for a detection of inspection fluid by means of an inspection fluid detector 2 based on a mass spectrometer, a pressure of about 0.1 mbar may be advantageous and/or necessary.

In method step C, the inspection container evacuation valve V2 and the test container pump valve V4 are closed, so that the respective pumps 4 and 6 are separated from the test container 1 and from the inspection container 5.

In method step D, the detector valve V1 is opened so that the inspection fluid detector 2 is connected to the inspection container 5. Further, the inspection fluid detector 2 is started or activated or set into operation. Preferably, the collection of measurement data on inspection fluid possibly present in the inspection container 5 starts with the activation of the inspection fluid detector 2. The activation of the inspection fluid detectors 2 can take place before, after, or simultaneously with the opening of the detector valve V1.

Optionally, after method step D, a check of the starting conditions can be carried out. This may for example be done to achieve a coordinated reaction to different measurement results in the preliminary measurement, i.e. before the start of the main measurement. Under certain circumstances it is possible that the evacuation to the negative pressure in the inspection container 5, in particular to a high vacuum, takes a long time (for example by outgassing from the test container 1). In this case, the background leakage rate in the inspection container 5 can drop sharply. Although this is not negative to the measurement is principle, the dynamic increase of background leakage rate at the start of the main measurement is changed thereby as well. Depending on the method of evaluation, it can therefore be advantageous that the background leakage rate be in a defined window at the start of the main measurement. If this window is exceeded, inspection fluid can be introduced into the inspection container 5 accordingly.

In method step E, inspection fluid is filled into the test container 1. The test container is mounted in the inspection container 5 for carrying out the integrity test. Filling of the inspection fluid into the test container 1 takes place by opening the inspection fluid supply valve V3. Here, inspection fluid is filled into the test container 1 until a test pressure $p_{test}$ is reached in the test container 1. Preferably, the test pressure $p_{test}$ is such that the test container 1 inflates, i.e. substantially unfolds, and the test container 1 is filled substantially absolutely. "Substantially absolutely" in this context means that due to the inspection fluid located therein at test pressure $p_{test}$, the test container 1 or the shell material at least partially tightens without mechanical stresses occurring, which damage the test container 1 or the shell material of the test container 1 or adversely affect it otherwise. Preferably, after filling of the test container 1, the inspection fluid supply valve V3 is closed again.

Thus, with method step E, the actual main measurement of the integrity test begins. In method step E, the test container 1 is evaluated. After a predetermined and/or predeterminable test time TestTime has lapsed without the signal provided by the inspection fluid detector 2 exceeding a predetermined limit RejectLimit from the start of the measurement until the end of the test time TestTime, the test container 1 is judged to be tight (method step F2). If the predetermined limit RejectLimit is exceeded, i.e. if the inspection fluid detector 2 detects a larger amount of inspection fluid or a greater change rate of inspection fluid in the inspection container 5 than a predetermined limit RejectLimit, the test container 1 is judged to be not tight or defective (method step F1). Here, the process can be terminated already before the end of the test time TestTime to avoid an increased contamination of the inspection container 5 with inspection fluid.

In method step G, the inspection fluid detector 2 is disconnected from the inspection container 5 and the main measurement is stopped. The inspection fluid detector 2 is disconnected by closing the detector valve V3, which terminates the measurement. Preferably, the inspection fluid detector 2 is stopped or its operation is stopped.

In method step H, the inspection fluid present in the test container 1 test fluid is pumped out of the test container 1. This is done by the inspection fluid supply unit 12, in particular by the inspection fluid recycling pump 8 by opening the inspection fluid discharge valve V7. The inspection fluid pumped out of the test container 1 is supplied to the inspection fluid collection container 7 by the inspection fluid recycling pump 8 and is available there preferably for further integrity tests. Pumping of the test fluid out of the test container 1 is considered completed when the predominant pressure in the test container 1 is not greater than a value $Limit1\_p_{test}$. The value $Limit1\_p_{test}$ is preferably not greater than 10 mbar, more preferably not more than 1 mbar, particularly preferably not greater than $10^{-2}$ mbar, most preferably not greater than $10^{-4}$ mbar.

In particular, it may be advisable to recycle the inspection fluid when the procurement of the inspection fluid is associated with a significant financial effort and/or if adverse effects of inspection fluid escaping into the atmosphere could adversely affect the environment and/or people nearby. If there is no risk of such restrictions, omission of the recycling of inspection fluid may be a more efficient solution in some cases.

In method step I, the test device 10 is vented. If a predetermined pressure in the test container 1 if fallen below due to the recycling process and if the inspection fluid is thus essentially completely evacuated from the test container 1, the valve V7 is closed again. Thereafter, the test device 10 is vented, i.e. in particular the test container 1, the inspection container 5, as well as at least partially the associated lines. Ventilation may be accomplished by opening the valves V5 and V6. Preferably, ventilation takes place until atmospheric pressure is reached in the vented parts of the test device 10.

In method step J, the end of the integrity test has been reached. After reaching the atmospheric pressure in the vented parts of the test device 10, the valves V5 and V6 are closed and the test device 10 is thus brought to the starting position, so that a new test procedure can be started.

Optionally, the interior of the test containers is flushed after inspection fluid has been detected in the inspection container 5. If a test object, i.e. a test container 1, is defective, inspection fluid will enter the interior of the inspection container 5 from the test container 1 during the test procedure. To avoid damage to the inspection container 5 by contamination with the inspection fluid, it will be cleaned by flushing after a test container 1 has been tested to be defective. After testing of an integer test container, flushing is not necessarily required and can be omitted. Thus, the interior of the inspection container 5 may be flushed in particular only after each test in which a test container 1 was rated defective. This is a further advantage of the method according to the invention, since due to the low permeation of inspection fluid through integer shell material, the quantity of inspection fluid getting into the inspection container is much smaller than in case of use of an inspection fluid having a higher permeation rate.

Further, a background concentration of inspection fluid is optionally set in the inspection container 5. Under certain circumstances, providing the negative pressure in the inspection container can take a long time, particularly in the event of outgassing from the test container. In this case, the background leakage rate may drop sharply as well. Although this is basically rather positive for the implementation of the integrity test, the dynamic increase of the leakage rate can be changed at the beginning of the measurement. Depending on the evaluation method of the integrity test, it may therefore be advantageous that the background leakage rate be in a predefined range and/or window at the beginning of the measurement. If this predefined range is fallen below, e.g. inspection fluid can be introduced into the inspection container. Thus, the background concentration of inspection fluid in the inspection container is set actively before starting the measurement for verifying the integrity of the test container.

Figure 3A:
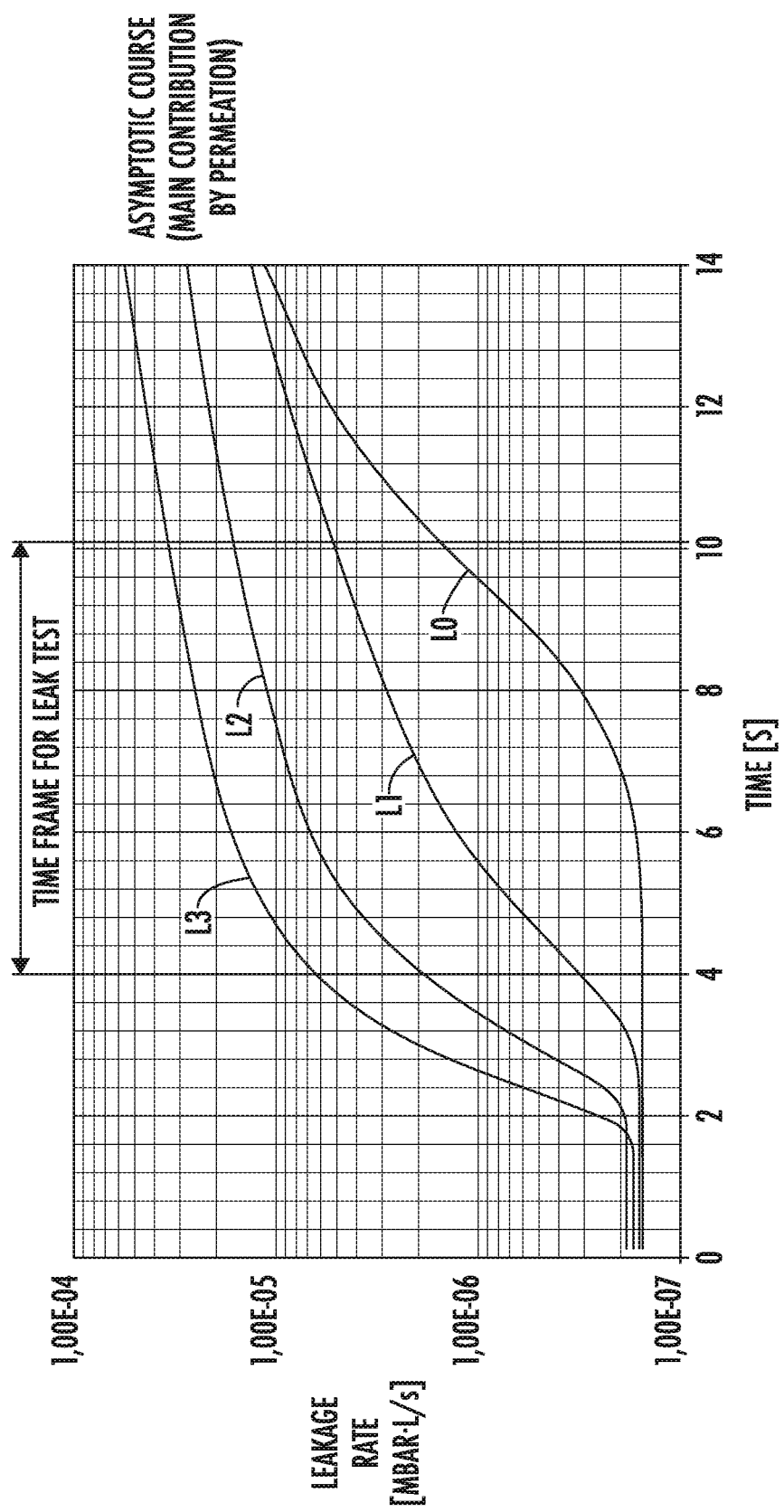
FIG. 3A is a diagram with time courses of measured changes in the inspection fluid quantity outside the test container for one tight and several defective test containers when He is used as the inspection fluid.

FIG. 3A is a diagram showing several curves L0 to L3 of time courses of the measured leakage rate of inspection fluid at which the inspection fluid enters the inspection container 5 from the test container 1, and is measured by the inspection fluid detector 2. For the integrity tests, their time course of the leakage rate being shown in FIG. 3, gaseous He was used as the inspection fluid. Each of the tested, identical test containers was a bag comprising a layer of the EVOH plastic material, wherein the shell material has a total thickness or a wall thickness of 360 µm and the bag has a capacity of 50 l. The permeation of inspection fluid through intact shell material is essentially determined by said layer of EVOH. The pressure difference between the interior of the bag and the immediate exterior of the bag was 50 mbar.

A first time course L0 shows the time course of the leakage rate of helium as an inspection fluid of an undamaged test container, i.e. a bag that does not have any leak. Although the test container 1 of the measurement L0 has no leak, the measured leakage rate increases significantly already after approximately 5 seconds. The inspection fluid stream from the test container 1 into the inspection container 5 underlying this increase of this leakage rate is caused by permeation of the inspection fluid through the shell material, in particular through undamaged shell material.

A second time course L1 shows the time course of the leakage rate of helium of a test container with a leak of 2 µm in diameter. A third time course L2 shows the time course of the leakage rate of helium inspection fluid of a test container with a leak of 5 µm in diameter. A fourth time course L3 shows the time course of the leakage rate of helium as the inspection fluid of a test container with a leak of 7 µm in diameter. The leaks were created by forming a hole with the precisely defined diameters in the shell material of the test container by means of a LASER. In all curves in FIG. 3, a background leakage rate between about $1.5 \cdot 10^{-7}$ and $2.10^{-7}$ mbar·l/s at the time t=0 can be identified.

The time courses L1, L2, and L3 of the leakage rates of the bags having a leak show a more rapid increase of the leakage rate over time than the intact bag without leak of the curve L0. Independent of the leak size, the curves L1, L2 and L3 have very similar thresholds or saturation values, which the respective time courses approach asymptotically (see FIG. 3B). The increase of the corresponding leakage rates is caused by an inspection fluid stream through the respective leak in the shell material on the one hand, and also by a permeation of helium through the intact shell material on the other hand, as can be seen from the intact bag in curve L0. In particular in the case of longer test times, with this inspection fluid stream the differently sized leaks can no longer be determined in a reliable manner due to the increasing contribution by the permeation. For this reason, only a very short time period of a few seconds, such as between 4 and 8 seconds after filling the bags, is available for an integrity test of such bags. Between 0 and 4 seconds after filling, there is the risk of the measurement result being influenced by the system inertia, as the inspection fluid may possibly not have flown in completely. Starting at a time of about 10 seconds after filling, however, the inspection fluid stream occurring due to permeation complicates the distinction of bags with differently sized leaks and tight bags.

The reason that the leakage rate increases particularly at the beginning with time and is not constant over time is particularly the inertia of the test system 10. Despite all the optimizations of the test procedure, in particular the inspection fluid needs time to flow into the test container and spread therein. Especially in large test containers 1, such as in bags with a large capacity of several liters or even several 10 or 100 liters, the inertia of the system is expressed in the measurement curves. For this reason, a reliable determination of leaks can be done only after a period of several seconds as a rule. Furthermore, it is also advisable to consider only those measurement values that were only collected when the system had enough time for a significant signal increase, i.e. when enough helium exited through the leak and reached the inspection fluid detector 2. In the curves shown, this is the case after about 4 seconds.

Since, already after a few seconds, the measured leakage rate change due to permeation increases more sharply than the leakage rate change due to a leak having a diameter of a few µm, the detectability of leaks having a diameter of a few µm decreases drastically already after a few seconds due to the permeation of He. As shown in FIG. 3, it is almost impossible to distinguish the curves L0 to L3 and the time courses of the leakage rates in the case shown already after 14 seconds. Thus, a reliable detection of leaks can be carried out only up to about 10 seconds after filling of the test container with helium.

Thus, with helium as the inspection fluid, the reliable performance of the integrity test is only possible in a short period of a few seconds, namely between about 4 and about 10 seconds after filling of the test container 1 in the cases shown in FIG. 3A. While the lower time limit is given by the reaction time of the test system 10 or the inspection fluid, the upper limit time is determined by the period in which the permeation of inspection fluid through the shell material of the test container 1 has not yet reached the level of the leakage rates of the smallest leaks to be detected. In particular in the case of integrity tests of test containers 1 or bags with a large capacity, this often leads to problems, since they require a long reaction time of the test system 10 and on the other hand thus also have a large surface of shell material and a high level of permeation.

FIG. 3B shows the same measured leakage rates of FIG. 3A on a longer time scale, which ranges from 0 to 120 seconds. To avoid repetitions, contents that have already been explained with reference to FIG. 3A will not be discussed in more detail here. In FIG. 3B, it can be seen in particular that all curves, i.e. L0, L1, L2 and L3, approach very similar saturation values or end values of the leakage rate. This does therefore not allow a reliable distinction among leaking bags with various leak sizes and/or the detection of leaking bags, since the contribution of substantially the same permeation rate of all bag has the largest contribution to the signals measured as the leakage rates.

In particular, it can be seen in FIG. 3B that for the tested bags, which have a capacity of about 50 l and a shell material area of about 8106 cm2 and were tested with He as the inspection fluid at a pressure difference of about 50 mbar, the He leakage rate of the tight bag (curve L0) has a value of about $5 \cdot 10^{-4}$ mbar·l/s. This corresponds to a permeation rate of about $1.2 \cdot 10^{-5}$ mbar·m/(s·bar) determined taking the shell material surface of the bag and the pressure difference into account. A reliable integrity test of such bags, especially bags of such a size, is thus hardly possible with He.

By analogy with FIG. 3A, FIG. 4 also shows a diagram with multiple curves L0 to L3 of time courses of the leakage rates of inspection fluid at which the test fluid enters the inspection container 5 from the test container 1, and is measured by the inspection fluid detector 2. For the time courses shown in FIG. 4, however, no gaseous He as in FIG. 3A was used, but SF6 (sulfur hexafluoride) according to another embodiment. The tested test containers 1 were identical to the corresponding test containers 1 of FIGS. 3A and 3B. To avoid repetitions, only the differences with respect to the diagram shown in FIG. 3A will be discussed.

In contrast to the curve L0 in FIG. 3A, the curve L0 in FIG. 4 remains substantially at a constant value of about 1.5.10-7 mbar·l/s, which corresponds to the background leakage rate. "Substantially at a constant value" means that there is no perceivable change and in particular no change that has a significant impact on the integrity test. The value of the background leakage rate further indicates that the permeation rate of $SF_6$ of the tested bags does not exceed a value of $3.7 \cdot 10^{-7}$ mbar·l/(s·bar), since otherwise the determined leakage rate for a tight bag (curve L0) would exceed the constant measured background leakage rate.

Accordingly, in combination with the test containers 1 or bags or shell materials of the test containers 1 to be tested as part of the invention, there is no appreciable permeation of $SF_6$ through the shell material when $SF_6$ is used as the inspection fluid. The reason for this may be that the permeation of $SF_6$ through the shell material of the test container 1 is significantly less than the permeation of He. This may be because $SF_6$ consists of comparatively large molecules and He of comparatively small atoms. Other gases comprising molecules or atoms with comparatively large dimensions in at least one direction in space (compared to He) can therefore often have a low permeation through the shell material of the test container.

Since the permeation substantially does not make a contribution to the measured leakage rate in the curves L1, L2 and L3 in FIG. 4, the measured leakage rates L1, L2 and L3 differ more strongly among each other than the corresponding leakage rates in FIG. 3. This allows an easier and more reliable determination of the leak size based on the measured leakage rate.

Furthermore, the period during which the test container 1 retains the inspection fluid efficiently and/or the permeation does not take on disturbing proportions with respect to the measurement is considerably longer than the corresponding period for the use of He in FIG. 3. This has the advantage that the performance of the integrity test, or measurement of the leakage rate, can be started at a later time after filling of the test container 1 and/or can be carried out over a longer period after filling of the test container 1 without having to fear a negative influence on the measurement by permeation of inspection fluid. This is particularly advantageous for testing large test containers 1 that have a large surface area and/or require a longer period to achieve a steady state after filling of the test container 1. In other words, the use of $SF_6$ in the illustrated embodiment reduces disturbing influences on the measurement result due to permeation, as occurs with the use of He as the inspection fluid, and allows a later start and/or a temporal extension of the measurement time in a integrity test, which is particularly advantageous for integrity tests on large-volume test containers 1, such as bags with a capacity of more than 10 l.

Figure 5:
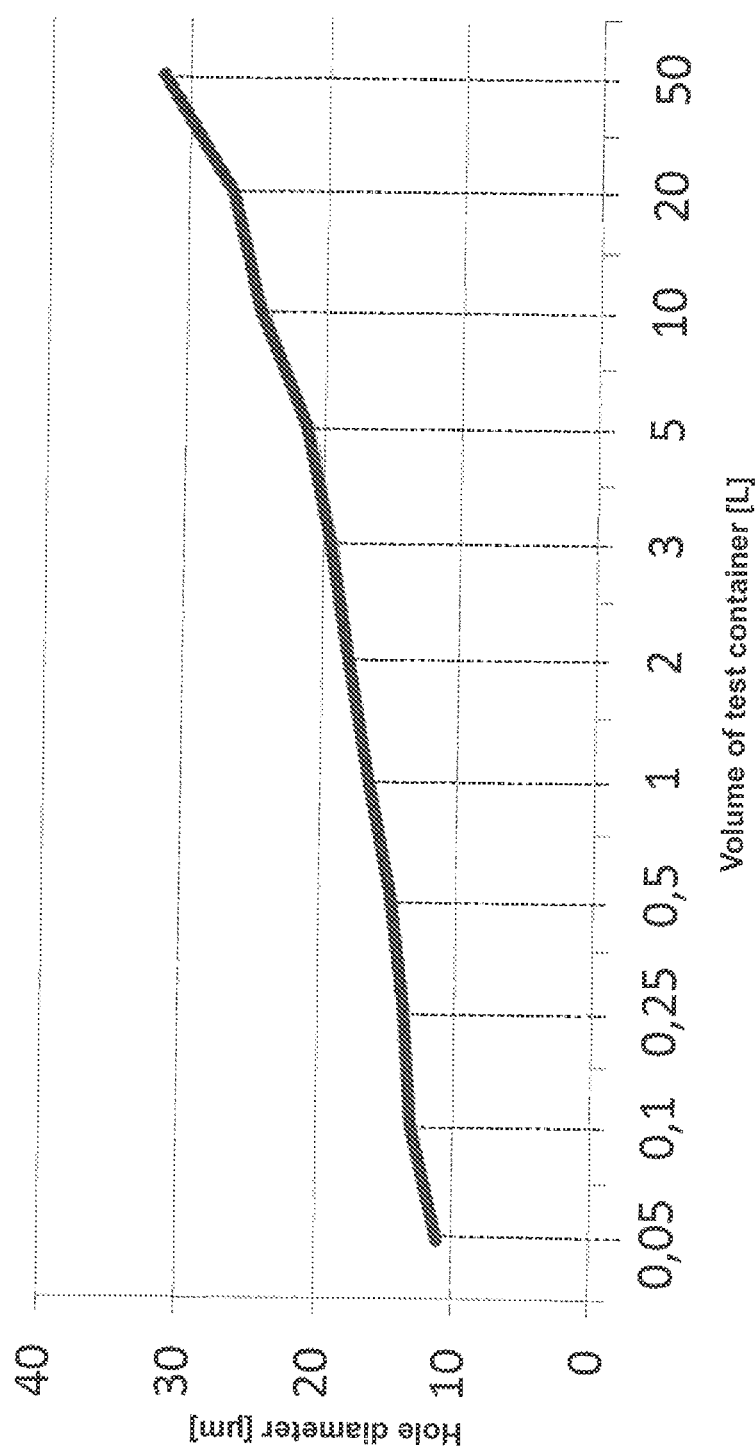
FIG. 5 is a diagram showing the diameter of the smallest reliably detectable hole for various test container volumes when helium is used as the inspection fluid.

FIG. 5 shows a diagram that plots a calculated equivalent size of leaks against the volume or the capacity of the test container 1 to be tested by a conventional He-based integrity tests. In other words, the diagram in FIG. 5 shows how large the diameter of an equivalent leak in the test container of a specific volume or capacity is so that it causes an inspection fluid stream that is equal to the inspection fluid stream due to permeation through the shell material of the test container. By means of a permeation study, in which the permeation of He through a film comprising an EVOH layer was assessed, the permeation rate of He was determined and then the corresponding values for the respective sizes of the surface of the bag with the corresponding volumes were determined. During the permeation study, a pressure difference of 1 bar was set on both sides of the EVOH layer.

It can be seen that for a 50 l bag, for example the permeation causes or allows an inspection fluid stream corresponding to the inspection fluid stream through a leak of about 30 μm in diameter. In an integrity test of such large bags, when using He as the inspection fluid, a detection of leaks with a diameter smaller than 30 μm would not or hardly be possible. Instead, a reliably detectable hole would have to have a much larger diameter than 30 μm, which therefore severely limits the suitability of a conventional integrity test in particular on the basis of He for assessing the integrity of such large bags.

If, nevertheless, a conventional method for an integrity test, in particular using He as the inspection fluid, of large-volume bags is used, only a very limited period of a few seconds is available to assess the tightness of the bag before the contribution of the permeation complicates the interpretation of the measurement signal or makes it impossible. Especially for bags with large volumes, however, unfolding or inflation of the bag may take a few seconds, so that too short a measurement time can distort the measurement result as well (see FIG. 3). Thus, a conventional method for performing integrity tests on such large bags can only be used to a very limited extent and has significant drawbacks in terms of a minimum size of detectable leaks.

This disadvantage can be overcome with the use of the inventive method for carrying out an integrity test, since such a small permeation rate, such as of $SF_6$, causes a much smaller inspection fluid stream and thus disturbing influences of the permeation on the measurement signal are much less pronounced than in conventional methods, or are even completely eliminated (see FIG. 4). Thus, the method according to the invention is particularly suitable and efficient for the performance of integrity tests for bags having a volume of several liters.

Furthermore, the invention relates to the following aspects:

A method 1 for performing an integrity test on a flexible test container, wherein
- the test container is arranged in an inspection container that can be closed in a fluid-tight manner,
- negative pressure is provided in the interior of the closed inspection container,
- an inspection fluid is filled into the test container arranged in the inspection container,
- inspection fluid present in the interior of the inspection container is detected, and
- negative pressure is provided prior to filling the inspection fluid into the test container arranged in the inspection container.

A method 2 according to method 1, wherein the negative pressure is provided in the test container before and/or while the negative pressure is provided in the interior of the inspection container.

A method according to methods 1 or 2, wherein during provision of the negative pressures in the test container and in the inspection container, the level of the vacuum in the test container is adjusted to the level of the vacuum in the inspection container.

A method according to method 4, wherein during provision of the negative pressures in the test container and in the inspection container, a pressure compensation between the interior of the test container and the interior of the inspection container takes place.

A method according to method 5, wherein the pressure compensation between the interior of the test container and the interior of the inspection container takes place by
- a coordination between an inspection container pump for evacuating the interior of the closed inspection container and a test container pump for evacuating the interior of the test container and/or
- by means of a separating valve.

A method 6 according to one of the preceding methods, wherein the vacuum in the test container is provided via a supply line via which the inspection fluid is filled into the test container as well.

A method 7 according to one of the preceding methods, wherein the interior of the inspection container is flushed after inspection fluid has been detected in the inspection container.

A method 8 according to one of the preceding methods, wherein a background concentration of inspection fluid is set in the inspection container.

A test device 1 for carrying out an integrity test on a flexible test container, with
- an inspection container that can be closed in a fluid-tight manner, in which the test container can be arranged,
- an inspection container pump for evacuating the interior of the closed inspection container,
- an inspection fluid source from which an inspection fluid can be filled into the test container arranged in the inspection container,
- an inspection fluid detector for detecting inspection fluid in the interior of the inspection container, and
- a pumping connection via which the interior of the test container arranged in the inspection container can be evacuated.

A test device 2 according to the test device 1, with a separating valve between the interior of the test container and the interior of the inspection container.

A use of the test device according to the test devices 1 or 2 for carrying out an integrity test on a flexible test container according to the method of one of the methods 1 to 8.

LIST OF REFERENCE NUMERALS 1 test container
2 inspection fluid detector
3 inspection fluid storage container
4 inspection container pump
5 inspection container
6 test container pump
7 inspection fluid collection container
8 inspection fluid recycling pump
10 test device
12 inspection fluid supply unit
L1 test container supply line
L2 inspection container supply line
L3 inspection container vent line
F1 test container filter
F2 inspection container filter
V1 detector valve
V2 inspection container evacuation valve
V3 inspection fluid supply valve
V4 test container pump valve
V5 inspection container vent valve
V6 test container vent valve
V7 inspection fluid discharge valve
ptest test pressure
TestTime test time
RejectLimit limit (tightness of the test container)

The invention claimed is:

1. A method for carrying out an integrity test on a hermetically sealed test container (1) in the form of a bag for bioprocessing, the bag comprising at least one flexible shell material comprised of plastic, the method being carried out by using a test device that includes an inspection container connected to an inspection container vent line (L3) having an inspection container vent valve (V5), and a test container supply line (L1) couplable to the test container (1) and connected to the inspection container vent line (L3), the test container supply line (L1) having an inspection fluid supply valve (V3), a test container vent valve (V6) and an inspection fluid discharge valve (V7), the test container supply line (L1) being connected to an inspection fluid supply unit (12) having an inspection fluid recycling pump (8) and an inspection fluid collection container (7), the method comprising the steps of:
- filling an inspection gas into the test container (1) by opening the inspection fluid supply valve (V3);
- detecting inspection gas present directly outside the test container;
- closing the inspection fluid supply valve (V3);
- pumping out the inspection gas from the test container (1) into the inspection fluid collection container (7) by opening the inspection fluid discharge valve (V7) and using the inspection fluid recycling pump (8); and
- venting the test device by opening the inspection container vent valve (V5) and the test container vent valve (V6), wherein the inspection gas is configured such that the permeation rate of inspection gas through intact shell material of the test container (1) is not greater than $1 \cdot 10^{-9}$ m/s.

2. The method according to claim 1, wherein there is a pressure difference in which a test pressure of the inspection gas in the test container (1) is greater than an ambient pressure directly outside the test container (1).

3. The method according to claim 2, wherein the pressure difference is in a range from 10 mbar to 1 bar.

4. The method according to claim 1, wherein the inspection gas comprises one or more of the substances Ne, Ar, Kr, Xe, Rn, $CO_2$ and $SF_6$.

5. The method according to claim 1, wherein detecting the inspection gas outside the test container (1) is carried out for a time period of more than 8 seconds after filling of the inspection fluid.

6. The method according to claim 1, wherein, the plastic of the at least one shell material is selected from the group consisting of ethylene vinyl acetate (EVA), ethylene vinyl alcohol (EVOH) and polyethylene (PE).

7. The method according to claim 1, wherein the capacity of the flexible test container (1) is at least about 10 liters.

8. The method according to claim 1, wherein detecting the inspection gas present directly outside the test container is performed by means of LASER absorption.

9. The method according to claim 1, wherein the inspection gas comprises $SF_6$.

10. A test device (10) for carrying out an integrity test on a hermetically sealed test container (1) in the form of a bag for bioprocessing, the bag comprising at least one flexible shell material comprised of plastic the test device comprising:
- an inspection container connected to an inspection container vent line (L3) having an inspection container vent valve (V5) for venting the inspection container;
- a test container supply line (L1) couplable to the test container (1) and connected to the inspection container vent line (L3), the test container supply line (L1) comprising:
  - an inspection fluid supply valve (V3) for filling inspection gas into the test container from an inspection fluid collection container (7) of an inspection fluid supply unit (12) connected to the test container supply line (L1),
  - a test container vent valve (V6) for venting the test container, and an inspection fluid discharge valve (V7) for draining inspection gas from the test container into the inspection fluid collection container (7) by using an inspection fluid recycling pump (8) of the inspection fluid supply unit (12); and an inspection gas detector (2) for detecting inspection gas directly outside the test container (1);

wherein the inspection gas is configured such that the permeation rate of inspection gas through intact shell material of the test container (1) is not greater than $1 \cdot 10^{-9}$ m/s.

11. The test device (1) of claim 10, wherein the test device has a support formed from a porous material that permits an escape of the inspection gas through the intact shell material of the test container (1).

12. A method for carrying out an integrity test on a hermetically sealed test container (1) in the form of a bag for bioprocessing, the test container (1) being formed from a flexible shell, the integrity test being carried out by using a test device that includes: an inspection container connected to an inspection container vent line (L3) having an inspection container vent valve (V5), and a test container supply line (L1) couplable to the test container (1) and connected to the inspection container vent line (L3), the test container supply line (L1) having an inspection fluid supply valve (V3), a test container vent valve (V6) and an inspection fluid discharge valve (V7), the test container supply line (L1) being connected to an inspection fluid supply unit (12) having an inspection fluid recycling pump (8) and an inspection fluid collection container (7), the method comprising the steps of:

filling the inspection gas into the test container (1) by opening the inspection fluid supply valve (V3) to achieve a pressure level of the inspection gas in the test container that exceeds a pressure level in the inspection container exteriorly of the test container by a specified pressure differential;

closing the test container to the supply of inspection gas and sealing the inspection container to ambient conditions;

placing areas of the inspection container external of the test container in communication with an inspection gas detector that is configured for detecting a presence of the inspection gas;

operating the inspection gas detector;

generating a fail signal and rejecting the test container (1) if the inspection gas detector detects an amount of the inspection gas that exceeds a threshold amount;

terminating the test and indicating passing of the test container (1) if the inspection gas detector does not detect an amount of the inspection gas that exceeds the threshold amount after a specified a time period of more than 8 seconds after closing the test container to the supply of inspection gas;

pumping out the inspection gas from the test container (1) into the inspection fluid collection container (7) by opening the inspection fluid discharge valve (V7) and using the inspection fluid recycling pump (8); and venting the test device by opening the inspection container vent valve (V5) and the test container vent valve (V6), wherein the inspection gas is selected such that a permeation rate of inspection gas through intact shell material of the test container (1) is not greater than $1 \cdot 10^{-9}$ m/s.

13. The method according to claim 12, wherein detecting the inspection gas outside the test container (1) is carried out for a time period of more than 12 seconds after filling of the inspection gas.

14. The method according to claim 12, wherein detecting the inspection gas outside the test container (1) is carried out for a time period of more than 20 seconds after filling of the inspection gas.

15. The method according to claim 12, wherein detecting the inspection gas outside the test container (1) is carried out for a time period of more than 30 seconds after filling of the inspection gas.

16. The method according to claim 12, wherein the inspection gas comprises $SF_6$.

* * * * *